United States Patent
Song

(10) Patent No.: US 12,259,734 B2
(45) Date of Patent: Mar. 25, 2025

(54) DEVICE AND METHOD FOR CONTROLLING VEHICLE PLATOONING MODE BASED ON IOT DEVICE AND CAMERA

(71) Applicant: HYUNDAI MOBIS CO., LTD., Seoul (KR)

(72) Inventor: Kyung Jung Song, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 251 days.

(21) Appl. No.: 17/988,133

(22) Filed: Nov. 16, 2022

(65) Prior Publication Data

US 2023/0297122 A1    Sep. 21, 2023

(30) Foreign Application Priority Data

Mar. 15, 2022    (KR) .......... 10-2022-0032364

(51) Int. Cl.
*B60W 40/02*    (2006.01)
*G05D 1/00*    (2006.01)

(52) U.S. Cl.
CPC .......... *G05D 1/0276* (2013.01); *B60W 40/02* (2013.01); *B60W 2554/80* (2020.02); *B60W 2556/65* (2020.02)

(58) Field of Classification Search
CPC ............ B60W 40/02; B60W 2554/80; B60W 2556/65; G05D 1/0276
See application file for complete search history.

(56) References Cited

U.S. PATENT DOCUMENTS

| | | | | |
|---|---|---|---|---|
| 2007/0233343 | A1* | 10/2007 | Saito | B62D 1/28 |
| | | | | 701/41 |
| 2011/0128124 | A1* | 6/2011 | Im | G01S 5/02524 |
| | | | | 340/8.1 |
| 2020/0125863 | A1* | 4/2020 | Shashua | G06V 20/58 |
| 2021/0056852 | A1* | 2/2021 | Lund | G08G 1/005 |
| 2022/0096003 | A1* | 3/2022 | Mai | H04L 25/0226 |

\* cited by examiner

*Primary Examiner* — Vivek D Koppikar
*Assistant Examiner* — Farhad Dawodi
(74) *Attorney, Agent, or Firm* — Morgan, Lewis & Bockius LLP

(57) ABSTRACT

A device and method for controlling platooning mode of a vehicle based on a IoT device and camera is disclosed. The method includes receiving beacon signals including unique identification information from a surrounding vehicle; determining that the surrounding vehicle is a platooning eligible vehicle included in the platooning group when the unique identification information corresponds to pre-stored platooning eligibility information; and activating the platooning mode of the vehicle based on whether at least one of intensities of the beacon signals or a reception time interval in which the beacon signals are received satisfies a predefined first condition.

12 Claims, 5 Drawing Sheets

DEVICE AND METHOD FOR CONTROLLING VEHICLE PLATOONING MODE BASED ON IOT DEVICE AND CAMERA

CROSS-REFERENCE TO RELATED APPLICATIONS

The present application is based on and claims the benefit of priority to Korean Patent Application Number 10-2022-0032364, filed on Mar. 15, 2022 in the Korean Intellectual Property Office, the entire disclosure of which is incorporated herein by reference.

TECHNICAL FIELD

The present disclosure relates to a device and a method for controlling a vehicle platooning mode based on an Internet of Things (IoT) device and a camera.

BACKGROUND

The content described below merely provides background information related to the present embodiment and does not constitute the related art.

As the technology of intelligent vehicles advances, a platooning technology in which several vehicles form a group and drive autonomously is being studied.

Platooning has an advantage of reducing fuel consumption due to air resistance by maintaining a platoon of vehicles. In addition, another advantage is that road usage can be increased due to platooning keeping the distance between vehicles closer than drivers driving the vehicles.

As described above, for autonomous platooning, vehicles participating in the group should exchange information such as locations and speeds of other vehicles in the group using inter-vehicle communication. In order to use this information for autonomous traveling, the information must be transmitted stably at a very fast cycle. Representative technologies of vehicle-to-vehicle communication include vehicle-to-vehicle (V2V) communication and Wireless Access in Vehicular Environments (WAVE) communication.

However, problems with platooning technology based on V2V communication or WAVE communication technology are that the vehicle must be equipped with an expensive communication chip and there must be surrounding infrastructure supporting such technologies. Furthermore, the V2V communication or WAVE communication technology is only focused on how the vehicle joins or leaves the platooning and is far from controlling the platooning mode while taking into account convenience of a driver.

SUMMARY

An embodiment of the present disclosure provides a method of controlling a platooning mode of a vehicle, the method including: receiving beacon signals including unique identification information from a surrounding vehicle: determining that the surrounding vehicle is a platooning eligible vehicle included in the platooning group when the unique identification information corresponds to pre-stored platooning eligibility information; and activating the platooning mode of the vehicle based on whether at least one of intensities of the beacon signals or a reception time interval in which the beacon signals are received satisfies a predefined first condition.

An embodiment of the present disclosure a device for controlling a platooning mode of a vehicle, the device comprising: an IoT device configured to receive beacon signals including unique identification information from a surrounding vehicle; and a processor configured to control the platooning mode of the vehicle, wherein the processor determines that the surrounding vehicle is a platooning eligible vehicle included in the platooning group when the unique identification information corresponds to pre-stored platooning eligibility information, and activates the platooning mode of the vehicle based on whether at least one of intensities of the beacon signals or a reception time interval in which the beacon signals are received satisfies a predefined first condition.

DETAILED DESCRIPTION

Figure 1:
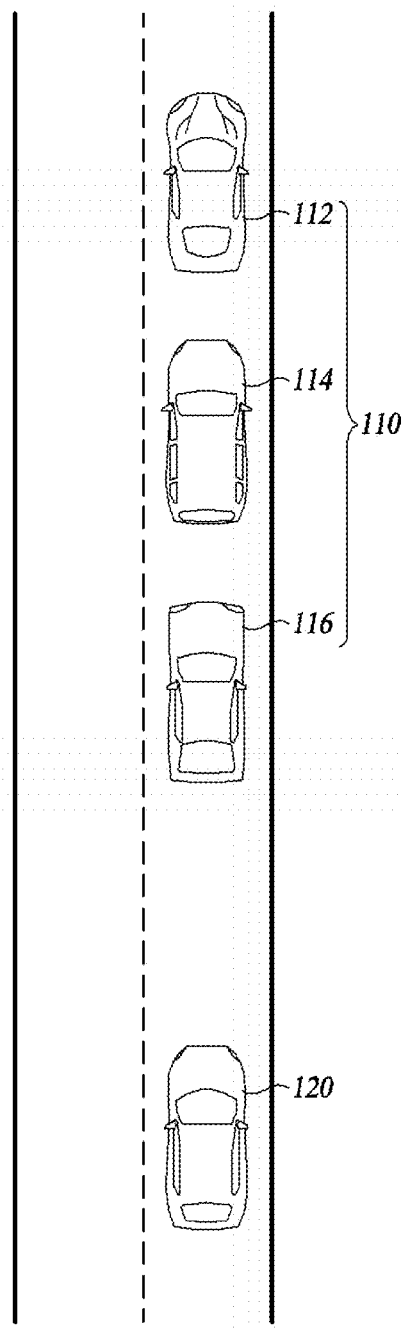
FIG. 1 is a view illustrating platooning according to one embodiment of the present disclosure.

In a method and a device of controlling a platooning mode of a vehicle according to one embodiment, it is possible to control the platooning mode of a vehicle without an expensive communication chip and infrastructure expansion by using a beacon signal transmitted from an IoT device of a surrounding vehicle.

In a method and a device of controlling a platooning mode of a vehicle according to one embodiment, by determining whether the vehicle is in a suitable state to perform platooning using an image of a camera as well as a signal of an IoT device, the vehicle can be controlled in a safe and reliable platooning mode.

In a method and a device of controlling a platooning mode of a vehicle according to one embodiment, it is possible to control the activation/deactivation of the platooning mode of a vehicle without driver intervention.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

FIG. 1 is a view illustrating platooning according to one embodiment of the present disclosure.

Referring to FIG. 1, a first platooning vehicle 112, a second platooning vehicle 114, and a third platooning vehicle 116 travel while forming a platooning group 110.

The first platoon driving vehicle 112 may be a leading vehicle (LV). Here, the leading vehicle (LV) refers to a vehicle that notifies other vehicles that autonomous platooning is possible and manages the group.

The second platooning vehicle 114 and the third platooning vehicle 116 may be a following vehicle (FV). Here, the following vehicle (FV) refers to a vehicle that receives traveling information from the leading vehicle and performs platooning based on the traveling information. Here, the traveling information may include a location, speed, direction, acceleration, and the like.

A fourth vehicle 120 is a vehicle that wants to participate in the platooning group 110 to perform platooning.

At this point, in order for the fourth vehicle 120 to join the platooning group 110, it should be possible to identify whether the vehicles located in the front are a platooning eligible vehicle. Here, the platooning eligible vehicle is a vehicle capable of forming a platooning group together with the fourth vehicle 120, and means a vehicle in platooning or a vehicle awaiting platooning.

According to one embodiment of the present disclosure, the fourth vehicle 120 may identify the platooning vehicle using an Internet of Things (IoT) device instead of a conventional expensive communication chip. To this end, each of the first platooning vehicle 112, the second platooning vehicle 114, the third platooning vehicle 116, and the fourth vehicle 120 is equipped with an IoT device.

Specifically, the IoT device in the third platooning vehicle 116 transmits a beacon signal including information indicating that the vehicle is a platooning vehicle, and the fourth vehicle 120 may identify that the third platooning vehicle 116 is a platooning eligible vehicle based on the beacon signal.

When the third platooning vehicle 116 is identified as the platooning eligible vehicle, the fourth vehicle 120 activates the platooning mode.

Meanwhile, it is necessary to determine whether the fourth vehicle 120 is in an appropriate state to perform platooning before activating the platooning mode. In particular, for the platooning, the fourth vehicle 120 must be a certain distance away from the lane lines of the lane it is traveling in so that the fourth vehicle 120 can travel along the lane it is traveling in or change lanes. If the fourth vehicle 120 is not a certain distance from the lane lines of the lane in which the vehicle is traveling, it is difficult for the fourth vehicle 120 to join the platooning group even when the platooning mode is activated. For example, when the fourth vehicle 120 is changing lanes, it is difficult for the fourth vehicle 120 to join the platooning group 110 even when the platooning mode is activated.

According to one embodiment of the present disclosure, the fourth vehicle 120 may determine whether a situation is appropriate for joining the platooning group 110 by using a camera that captures a forward-view image. To this end, the fourth vehicle 120 is further equipped with a camera.

Specifically, the fourth vehicle 120 takes a forward-view image using a camera, and determines whether the fourth vehicle 120 can join the platooning group 110 based on the distance between the fourth vehicle 120 and the lane lines according to the forward-view image. In one embodiment, the fourth vehicle 120 can determine whether it is in a state capable of joining the platooning group 110 based further on the distance to the third platooning vehicle 116. Based on the determination result and the beacon signal, the fourth vehicle 120 activates the platooning mode.

The fourth vehicle 120 joins the platooning group 110 by acquiring the platooning information from the platooning group 110 or sensing the third platooning vehicle 116.

Figure 2:
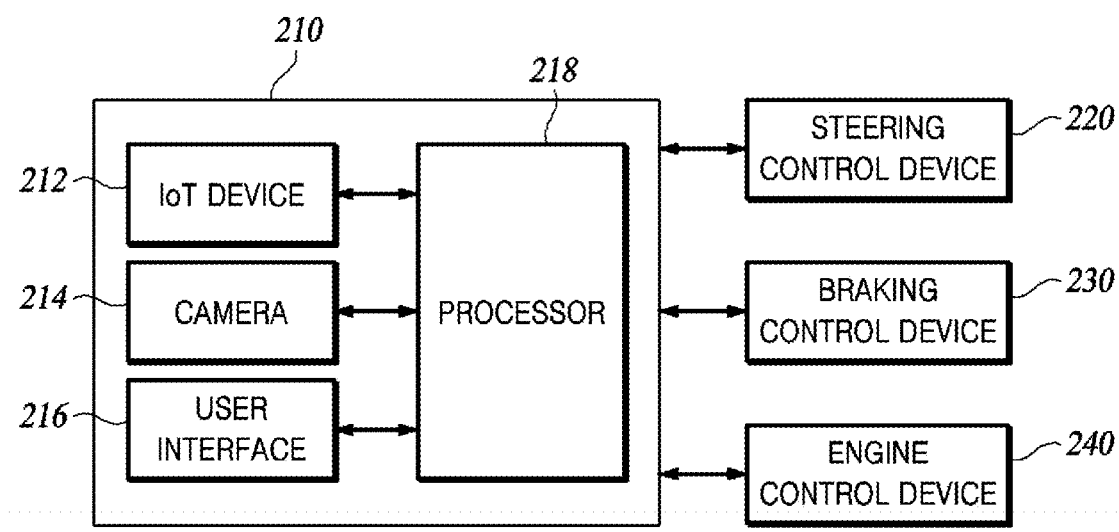
FIG. 2 is a block diagram of a vehicle according to one embodiment of the present disclosure.

FIG. 2 is a block diagram of a vehicle according to one embodiment of the present disclosure.

Referring to FIG. 2, the vehicle includes a mode control device 210, a steering control device 220, a braking control device 230, and an engine control device 240. In addition, the vehicle may further include various sensors such as a GPS module, radar, lidar, and infrared sensor.

The mode control device 210 activates the vehicle platooning mode using at least one of a beacon signal or a forward-view image received from the surrounding vehicle.

The steering control device 220 may be configured to control a steering angle of the vehicle and may include a steering wheel, an actuator linked to the steering wheel, and a controller for controlling the actuator. The steering control device 220 may be implemented by an equivalent hardware.

The braking control device 230 may be configured to control braking of the vehicle, and may include a controller for controlling the brake.

The engine control device 240 may be configured to control driving of an engine of the vehicle, and may include a controller for controlling a speed of the vehicle. The braking control device 230 and the engine control device 240 may be a hardware device implemented by various electronic circuits (e.g., computer, microprocessor, CPU, ASIC, circuitry, logic circuits, etc.), respectively. The braking control device 230 and the engine control device 240 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

When the platooning mode of the vehicle is activated, the vehicle joins the surrounding platooning group and performs platooning. The steering control device 220, the braking control device 230, and the engine control device 240 operate in the platooning mode. The steering control device 220, the braking control device 230, and the engine control device 240 perform vehicle control logic such as vehicle tracking, automatic lane change, and following the front vehicle through longitudinal and lateral control. For example, the vehicle may centrally follow a preceding vehicle.

Hereinafter, the operation of the mode control device 210 will be described in detail.

The mode control device 210 (a device for controlling a platooning mode of a vehicle or a control device) includes an IoT device 212 and a processor 218. The mode control device 210 may further include at least one of a camera 214 or a user interface 216.

The IoT device 212 communicates with other IoT devices provided in the surrounding vehicle.

The IoT device 212 receives a beacon signal of the surrounding vehicle. At this time, the beacon signal of the surrounding vehicle includes unique identification information to indicate whether the surrounding vehicle is a platooning eligible vehicle. The unique identification information is information set for a plurality of IoT devices to identify each other. The unique identification information may refer to a Service Set Identifier (SSID) or a Universally Unique Identifier (UUID). Furthermore, the beacon signal may further include location information of the surrounding vehicle.

The IoT device 212 may transmit the beacon signal. The IoT device 212 may broadcast the beacon signal. Similarly, the beacon signal of the IoT device 212 includes the unique identification information of the vehicle.

The IoT device 212 includes a short-range communication module to communicate with other IoT devices. Here, Bluetooth, Bluetooth Low Energy (BLE), ZigBee (ZigBee), Ultra Wideband (UWB), Radio Frequency Identification (RFID), Infrared Data Association (IrDA), or the like may be included as the short-range communication technology. In particular, the IoT device 212 mainly uses BLE communication.

The camera 214 captures an image of the vehicle's surroundings. In particular, the camera 214 may acquire a forward-view image of the vehicle. Depending on the angle of view of the camera 214, the camera 214 may acquire not only the forward-view image of the vehicle but also side-view images.

The camera 214 may include a plurality of cameras disposed at different positions on an exterior of the vehicle. One of the plurality of cameras may generate a forward-view of the vehicle by collecting images obtained from the plurality of cameras.

The camera 214 may perform some functions of the processor 218. To do this, the camera 214 may include an image sensor and an image processing module. The camera 214 may process still images or moving images obtained by an image sensor (for example, CMOS or CCD). The image processing module may process a still image or a moving image obtained through the image sensor, extract necessary information, and transmit the extracted information to the processor 218.

The user interface 216 provides necessary information to the passenger or receives a predetermined request from the passenger.

The user interface 216 may be implemented as a device capable of exchanging various sensory information such as human hearing, sight, and touch. For example, the user interface 216 may include a User Setting Mode (USM) device or a Human-Machine Interaction (HMI) device.

According to one embodiment of the present disclosure, the user interface 216 may receive a control authority for the platooning mode from a driver or a passenger. Here, the control authority regarding the platooning mode refers to authority to activate or deactivate the platooning mode of the mode control device 210 of the vehicle. The driver or passenger may also revoke the control authority for the platooning mode through the user interface 216.

The processor 218 controls the platooning mode of the vehicle based on at least one of a beacon signal or a forward-view image of the surrounding vehicle.

The processor 218 may be electrically connected to the IoT device 212, the camera 214, the user interface 216, and the like, and may electrically control the respective components. The processor 218 may be a hardware device implemented by various electronic circuits (e.g., computer, microprocessor, CPU, ASIC, circuitry, logic circuits, etc.) that execute commands of software, thereby performing various data processing and calculations described below. For example, the processor 218 may be an electronic control unit (ECU), a micro controller unit (MCU), or other sub-controllers mounted in the vehicle. The processor 218 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor 218 may be implemented as separate semiconductor circuits. Alternatively, the memory and the processor 218 may be implemented as a single integrated semiconductor circuit. The processor 218 may embody one or more processor(s).

According to one embodiment of the present disclosure, the processor 218 determines whether the surrounding vehicle that has transmitted the beacon signal is the platooning eligible vehicle, and activates the platooning mode of the vehicle based on whether the received beacon signals satisfy a pre-defined first condition.

Specifically, the processor 218 determines whether the unique identification information in the beacon signal received from the surrounding vehicle corresponds to a pre-stored platooning eligibility information. Here, the platooning eligibility information is information stored in advance to determine whether the surrounding vehicle transmitting the beacon signal is the platooning eligible vehicle. When the unique identification information of the surrounding vehicle corresponds to the platooning eligibility information, the processor 218 determines that the surrounding vehicle is the platooning eligible vehicle.

Thereafter, the processor 218 determines whether at least one of the intensities of the beacon signals received from the surrounding vehicle or a reception time interval in which the beacon signals are received satisfies a first condition. Here, according to one embodiment of the present disclosure, the first condition is that the intensity of at least one of the beacon signals is greater than or equal to a preset intensity. According to another embodiment of the present disclosure, the first condition is that beacon signals are received during a preset time interval. According to another embodiment of the present disclosure, the first condition is that the intensities of the beacon signals are greater than or equal to the preset intensity, and the beacon signals are received during the preset time interval.

When at least one of the intensities of the beacon signals or the reception time interval in which the beacon signals are received satisfies the first condition, the control device activates the platooning mode of the vehicle.

However, according to another embodiment of the present disclosure, even when the first condition is satisfied, the processor 218 activates the platooning mode after determining whether the traveling control of the vehicle is possible.

Specifically, the processor 218 detects the lane lines of the lane in which the vehicle is traveling from the forward-view image captured by the camera 214. The processor 218 calculates an offset distance from the lane lines of the lane the vehicle is traveling in as distance information.

In order to determine whether the traveling control of the vehicle is possible, the processor 218 determines whether the offset distance satisfies a second condition. Here, according to one embodiment of the present disclosure, the second condition is that the offset distance is more than or equal to a preset distance.

According to another embodiment of the present disclosure, the processor 218 may further detect a front vehicle in the forward-view image and calculate the distance to the front vehicle as distance information. The distance information may include at least one of the offset distance or the distance to the front vehicle. Calculating the distance to the front vehicle is for determining whether longitudinal control of the vehicle is possible or whether a front vehicle following control is possible. This is because when the front vehicle is far away, it is difficult for the vehicle to join the platooning. In one example, the second condition may be that the distance to the front vehicle is within a preset range. In another example, the second condition may be that the offset distance is more than the preset distance and the distance to the front vehicle is within the preset range. The preset range is determined by at least one of the minimum or maximum distance from the vehicle.

When the distance information of the vehicle satisfies the second condition, the processor 218 determines that traveling control of the vehicle is possible.

When both the first condition and the second condition are satisfied, the control unit activates the platooning mode of the vehicle.

Meanwhile, the surrounding vehicle that has transmitted the beacon signals and the surrounding vehicle in the forward-view image may or may not be the same vehicle. Accordingly, the control device needs to determine that the surrounding vehicle and the front vehicle are the same vehicle.

According to one embodiment of the present disclosure, the processor 218 determines if the IoT device is provided in the front vehicle based on the forward-view image. Specifically, when image of the IoT device is detected in an area of the front vehicle detected in the forward-view image, the processor 218 determines that the IoT device is provided in the front vehicle.

When it is confirmed that the IoT device is provided in the front vehicle, the processor 218 determines that the surrounding vehicle and the front vehicle are the same vehicle. When the first condition and the second condition are satisfied and the front vehicle is equipped with the IoT device, the processor 218 activates the platooning mode of the vehicle. In contrast, in response to determination that the front vehicle is not equipped with the IoT device, the control device deactivates the platooning mode of the vehicle.

Figure 3:
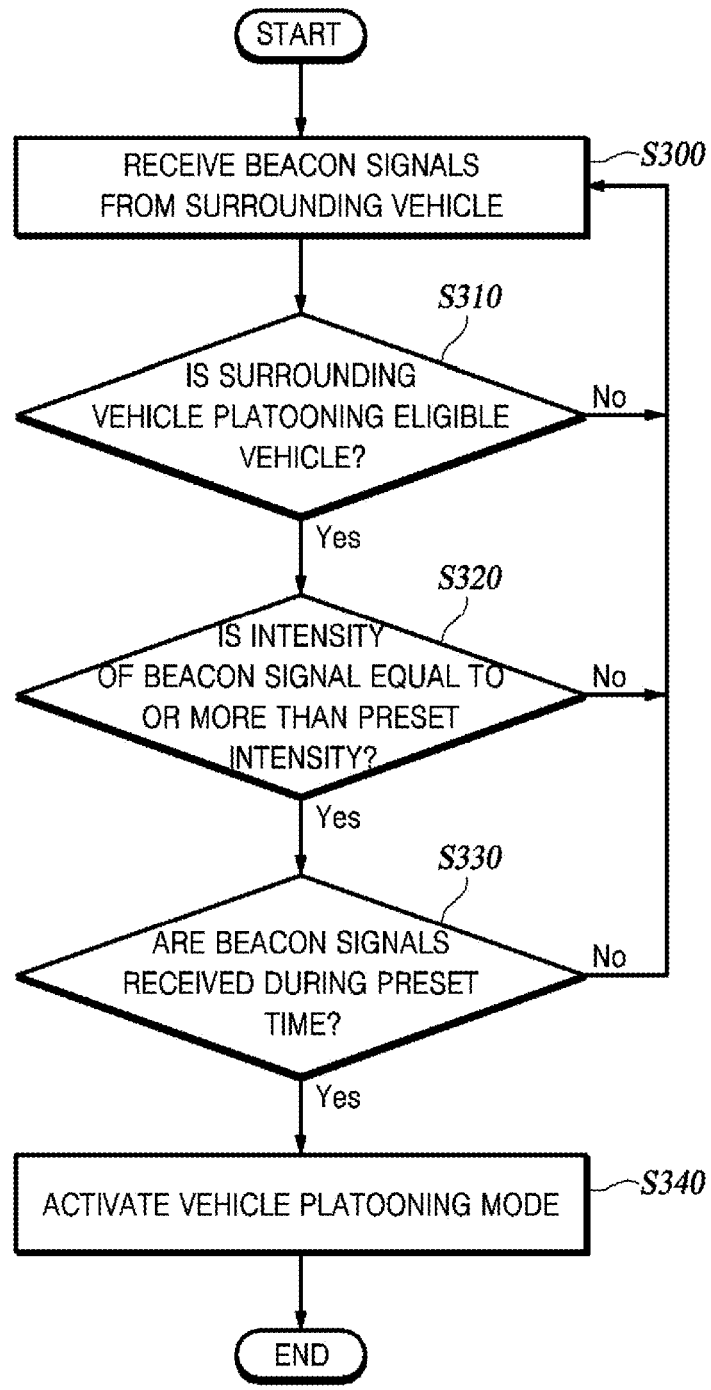
FIG. 3 is a flowchart of a method of controlling a platooning mode based on a beacon signal according to one embodiment of the present disclosure.

FIG. 3 is a flowchart of a method of controlling a platooning mode based on a beacon signal according to one embodiment of the present disclosure.

Referring to FIG. 3, a control device for controlling the platooning mode of the vehicle according to one embodiment of the present disclosure activates the platooning mode of the vehicle depending on whether the beacon signal intensity and the reception time interval of the beacon signal satisfy a predefined first condition.

The control device receives the beacon signals from the surrounding vehicle (S300).

In detail, the control device receives the beacon signals from the IoT device of the surrounding vehicle.

For transmission and reception of the beacon signals, each of the vehicle and the surrounding vehicle is equipped with the IoT device. The IoT device of the surrounding vehicle transmits the beacon signal including the unique identification information corresponding to the predefined platooning eligibility information. Each beacon signal may also include traveling information such as location information of the surrounding vehicle. The surrounding vehicle may broadcast beacon signals using the IoT device.

The control device determines whether the surrounding vehicle is the platooning eligible vehicle (S310).

Specifically, the control device determines whether the surrounding vehicle is the platooning eligible vehicle using the unique identification information included in the beacon signal received from a peripheral device. To achieve this, the control unit saves the platooning eligibility information in its internal memory in advance. The platooning eligibility information may have any one of SSID or UUID to correspond to unique identification information. The control device determines whether the surrounding vehicle is the platooning eligible vehicle by comparing the UUID included in the beacon signal with the UUID stored in the internal memory.

In one embodiment, the platooning eligibility information may be stored in the form of a list including a plurality of unique identification information corresponding to the platooning eligible vehicle. For example, the platooning eligibility information may include a first unique identification information indicating that the vehicle is a platooning eligible truck, or a second unique identification information indicating that the vehicle is a platooning eligible car. When the received unique identification information is the same as the platooning eligibility information stored in the internal memory, the control device determines that the surrounding vehicle is the platooning eligible vehicle.

When it is determined that the surrounding vehicle is not the platooning eligible vehicle, the control device deactivates the platooning mode of the vehicle.

On the other hand, when it is determined that the surrounding vehicle is the platooning eligible vehicle, the control device determines whether the intensities of the beacon signals received from the surrounding vehicle are greater than or equal to the preset intensity (S320).

In Step S320, the control device filters the platooning eligible vehicle that is too far away. The control device may determine whether the intensity of at least one of the beacon signals is greater than or equal to a preset intensity. When the intensity of the beacon signals is less than the preset intensity, the control device determines that the surrounding vehicle is located far from the vehicle. Meanwhile, when the intensity of the beacon signals is more than the preset intensity, the control device determines that the surrounding vehicle is located in the vicinity of the vehicle.

In addition, when the intensities of the beacon signals are greater than or equal to the preset intensity, the control device determines whether the beacon signals from the surrounding vehicle are received during a preset time interval (S330).

Step S330 is to check communication stability between the control device and the IoT device of the surrounding vehicle. When the beacon signals are not received during the preset time period, the control device determines that communication with the IoT device of the surrounding vehicle is unstable. When beacon signals are received during the preset time period, the control device determines that communication with the IoT device of the surrounding vehicle is stable.

In addition, when the beacon signals are received during the preset time period, the control device activates the platooning mode of the vehicle (S340).

When the platooning mode is activated, the vehicle travels to follow the surrounding vehicle using at least one of traveling information or sensor information included in the beacon signal.

According to another embodiment of the present disclosure, either Step S320 or Step S330 may be omitted. That is, the control device may activate the platooning mode of the vehicle based on if at least one of the intensities of the beacon signals or the reception time interval in which the beacon signals are received satisfies a predefined first condition.

Figure 4:
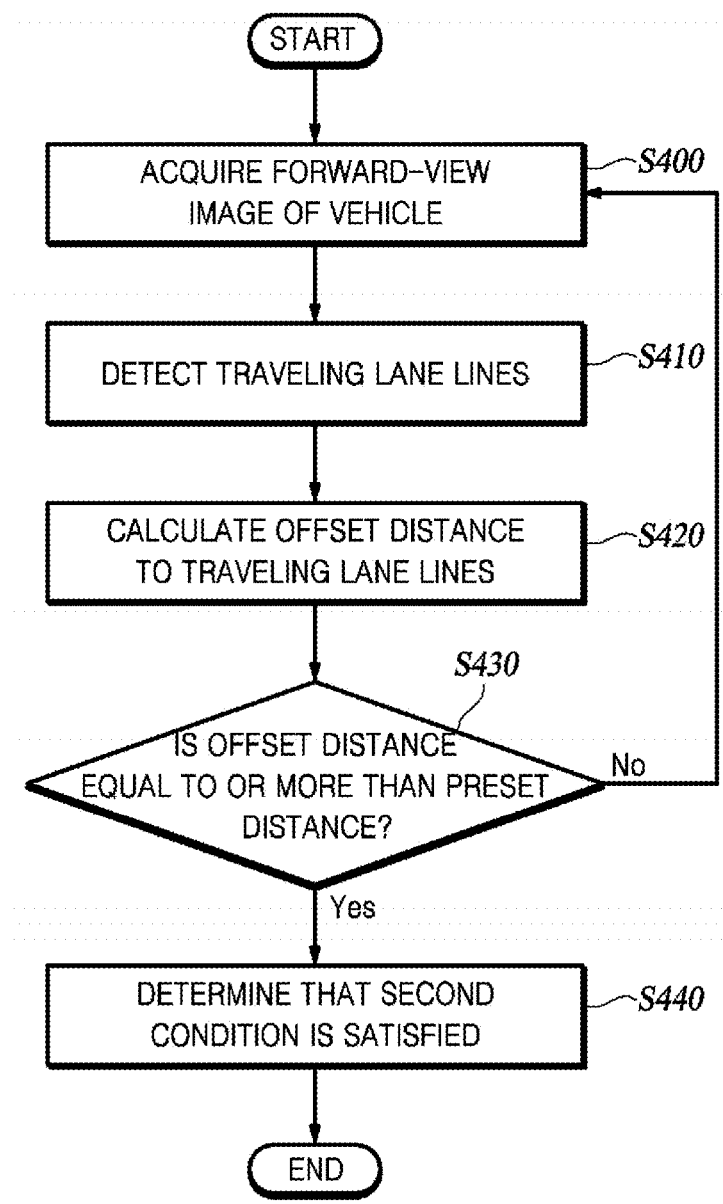
FIG. 4 is a flowchart illustrating a process determining based on a forward-view image whether a second condition is satisfied according to one embodiment of the present disclosure.

FIG. 4 is a flowchart of a process of determining whether the second condition is satisfied based on the forward-view image according to one embodiment of the present disclosure.

Referring to FIG. 4, the control device according to one embodiment of the present disclosure extracts distance information from the forward-view image photographed by a camera and can determine whether the vehicle is in an appropriate state to join the platooning group depending on whether the distance information satisfies the predefined second condition. The control device may activate the platooning mode of the vehicle when both the first condition and the second condition are satisfied.

The control device acquires the forward-view image of the vehicle using the camera (S400).

The control device detects lane lines of the lane in which the vehicle is traveling from the forward-view image (S410).

The control device detects boundaries on both sides of the lane on which the vehicle is traveling as traveling lane lines. The control device can detect the traveling lane lines using a detection model trained based on image processing technology or deep learning.

When either of the lane boundaries is not detected due to factors such as the image quality of the forward-view image or the weather, the control device may generate a virtual line. When the virtual line cannot be generated, the control device may perform lateral control or longitudinal control to follow a preceding vehicle that exists within a predetermined distance.

The control device may further detect the front vehicle from the forward-view image.

The control device calculates an offset distance from the traveling lane lines (S420).

Specifically, the control device calculates an offset distance indicating a distance from one of both boundaries of the lane the vehicle is traveling in to the position of the vehicle based on the forward-view image. Additionally, the control device may calculate a distance from the vehicle to the front vehicle based on the forward-view image.

The control device determines whether the offset distance is greater than or equal to the preset distance (S430).

In Step S430, a lane keeping ability or a lane changing ability of the vehicle is determined. Since the vehicle cannot perform the lane change and the platooning joining at the same time, the control unit compares the offset distance with the preset distance. When the offset distance is closer than the preset distance, the control device determines that the vehicle is in a lane change state or out of control state.

According to one embodiment of the present disclosure, when the offset distance is greater than or equal to the preset distance, the control device may further determine whether the distance to the front vehicle is within the preset range. When the distance to the front vehicle is out of the preset range, the control device determines that the front vehicle is too far to perform the platooning and the IoT device identification.

When the offset distance is equal to more than the preset distance, the control device determines that the distance information derived from the forward-view image satisfies the second condition (S450).

When the beacon signals satisfy the first condition and the distance information satisfies the second condition, the control device activates the platooning mode. When the received beacon signals satisfy the first condition, the control device checks whether the vehicle is in an appropriate state to join the platooning based on the second condition, thereby enabling stable and reliable platooning.

Figure 5:
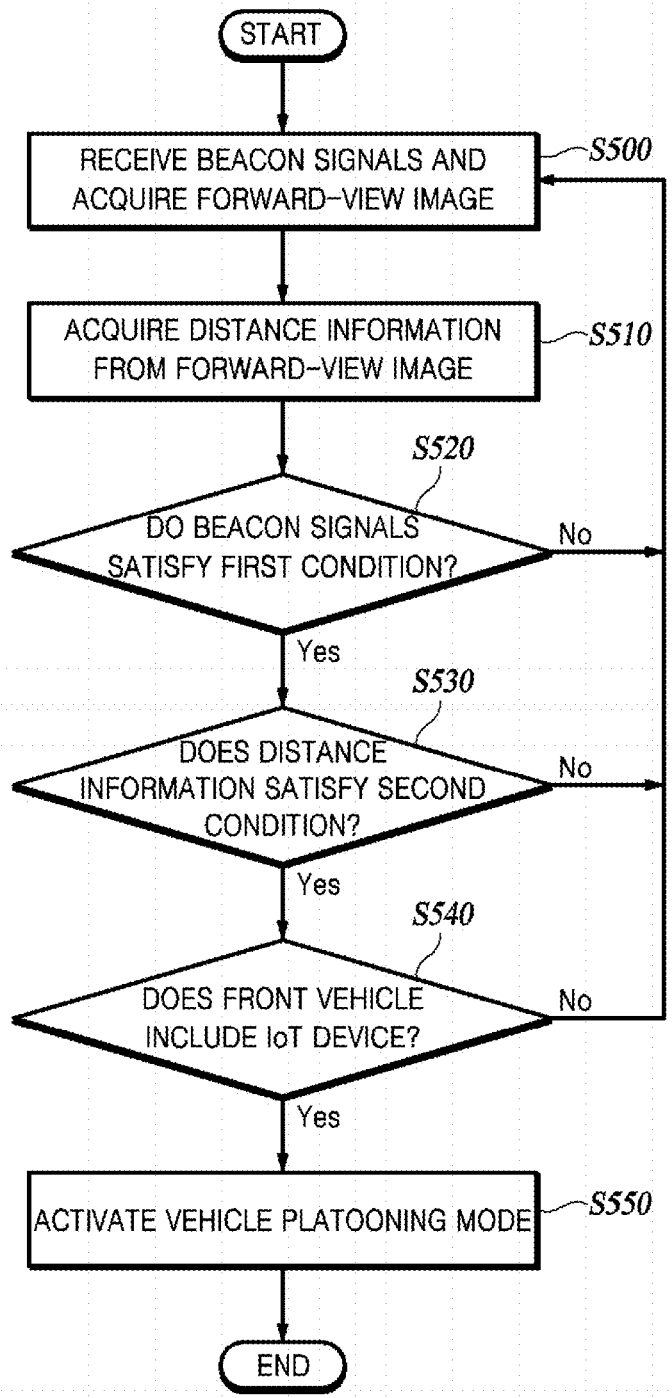
FIG. 5 is a flowchart of a platooning mode control process according to one embodiment of the present disclosure.

FIG. 5 is a flowchart of a platooning mode control process according to one embodiment of the present disclosure.

Referring to FIG. 5, the control device according to one embodiment of the present disclosure can activate the platooning mode by taking into account not only whether the first condition of beacon signals and the second condition of the distance information are satisfied, but also whether the front vehicle is equipped with the IoT device.

The control device receives the beacon signals and acquires a forward-view image (S500).

The beacon signals are transmitted from the surrounding vehicle. Meanwhile, the forward view image includes the front vehicle.

The control device obtains the distance information from the forward-view image (S510).

Here, the distance information includes at least one of the offset distance from the traveling lane lines or the distance to the front vehicle.

The control device determines whether the beacon signals satisfy the first condition (S520).

Whether the beacon signals satisfy the first condition is performed based on the processes described in FIG. 3.

When the beacon signals satisfy the first condition, the control device determines whether the distance information satisfies the second condition (S530).

Whether the distance information satisfies the second condition is performed based on the processes described in FIG. 4.

Meanwhile, the control device needs to determine whether the surrounding vehicle transmitting beacon signals and the front vehicle included in the forward-view image are the same vehicle.

To achieve this, when both the first condition and the second condition are satisfied, the control device determines whether the front vehicle includes the IoT device (S540).

The control device may determine whether the front vehicle has the IoT device by detecting the IoT device attached to the front vehicle in the forward-view image.

Specifically, the control device stores images captured by the IoT device from various angles. The control device detects an object corresponding to the stored image in the forward-view image. When the corresponding object is not detected, the control device determines that the front vehicle does not have the IoT device. However, when the corresponding object is detected, the control device determines that the front vehicle is equipped with the IoT. Furthermore, the control device determines that the front vehicle in the forward-view image and the surrounding vehicle that transmitted beacon signals are the same vehicle. That is, Step S540 is for determining that the front vehicle in the forward-view image and the surrounding vehicle transmitting beacon signals are the same vehicle.

When the front vehicle is equipped with the IoT device, the control device activates the platooning mode of the vehicle (S550).

According to the method and device of controlling a platooning mode of a vehicle according to one embodiment, it is possible to control the platooning mode of a vehicle by using a beacon signal transmitted from an IoT device of a surrounding vehicle without an expensive communication chip and infrastructure expansion.

According to the method and device of controlling a platooning mode of a vehicle according to one embodiment, by determining whether the vehicle is in a suitable state to perform platooning traveling using an image of a camera as well as a signal of an IoT device, the vehicle can be controlled in a safe and reliable platooning mode.

According to the method and device of controlling a platooning mode of a vehicle according to one embodiment, it is possible to control the activation/deactivation of the platooning mode of the vehicle without driver intervention.

According to the method and device of controlling a platooning mode of a vehicle according to one embodiment, by utilizing cost-competitive IoT devices to improve the economic feasibility and versatility of a platooning technology, it is possible to improve fuel efficiency and to reduce emissions which may result in environmentally friendly effects and reduction in traffic accident rates.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium includes all types of recording devices in which computer-readable data can be stored. The computer-readable recording medium may be a non-volatile or non-transitory medium such as a read-only memory (ROM), a CD-ROM, a magnetic tape, a floppy disk, a memory card, a hard disk, a magneto-optical disk, and a storage device, In addition, the computer-readable recording medium may further include a transitory medium such as a data transmission medium. Furthermore, the computer-readable recording medium may be distributed over computer systems connected through a network, and the computer-readable program code may be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method of controlling a platooning mode of a vehicle using a processor-based system for communication and lane analysis, the method comprising:
   Receiving, via an IoT device configured for short-range communication, beacon signals including unique identification information from a surrounding vehicle;
   determining, with a processor, that the surrounding vehicle is a platooning eligible vehicle when the unique identification information corresponds to pre-stored platooning eligibility information;
   acquiring a forward-view image of the vehicle;
   detecting lane lines of a lane in which the vehicle is traveling from the forward-view image;
   calculating an offset distance of the vehicle from the lane lines of the lane; and
   activating the platooning mode of the vehicle based on whether the beacon signals satisfy a first condition and whether the offset distance satisfies a second condition.

2. The method of claim 1, wherein the first condition is that an intensity of at least one of the beacon signals is greater than or equal to a preset intensity.

3. The method of claim 1, wherein the first condition is that the beacon signals are received during a preset time interval.

4. The method of claim 1, wherein the first condition is that intensities of the beacon signals are greater than or equal to a preset intensity and the beacon signals are received during a preset time interval.

5. The method of claim 1, wherein the second condition is that the offset distance is greater than or equal to a preset distance.

6. The method of claim 1, further comprising:
   detecting a front vehicle in the forward-view image;
   determining whether the front vehicle is equipped with an IoT device based on the forward-view image; and
   in response to determination that the front vehicle is not equipped with the IoT device, deactivating the platooning mode of the vehicle.

7. A platooning mode control device of a vehicle, the platooning mode control device comprising:
   an IoT device configured to receive beacon signals, via short-range communication, the signals including unique identification information from a surrounding vehicle;
   a camera configured to acquire a forward-view image of the vehicle; and
   a processor configured to control the platooning mode of the vehicle,
   wherein the processor is configured to:
   determines that the surrounding vehicle is a platooning eligible vehicle when the unique identification information corresponds to pre-stored platooning eligibility information,
   detect lane lines of a lane in which the vehicle is traveling from the forward-view image, calculate an offset distance of the vehicle from the lane lines of the lane, and activates the platooning mode of the vehicle based on whether the beacon signals satisfy a first condition and whether the offset distance satisfies a second condition.

8. The device of claim 7, wherein the first condition is that an intensity of at least one of the beacon signals is greater than or equal to a preset intensity.

9. The device of claim 7, wherein the first condition is that the beacon signals are received during a preset time interval.

10. The device of claim 7, wherein the first condition is that intensities of the beacon signals are greater than or equal to a preset intensity, and the beacon signals are received during a preset time interval.

11. The device of claim 7, wherein the second condition is that the offset distance is greater than or equal to a preset distance.

12. The device of claim 7, wherein the processor:

detects a front vehicle in the forward-view image, determines whether the front vehicle is equipped with an IoT device based on the forward-view image, and in response to determination that the front vehicle is not equipped with the IoT device deactivates the platooning mode of the vehicle.

* * * * *